Figure 1:
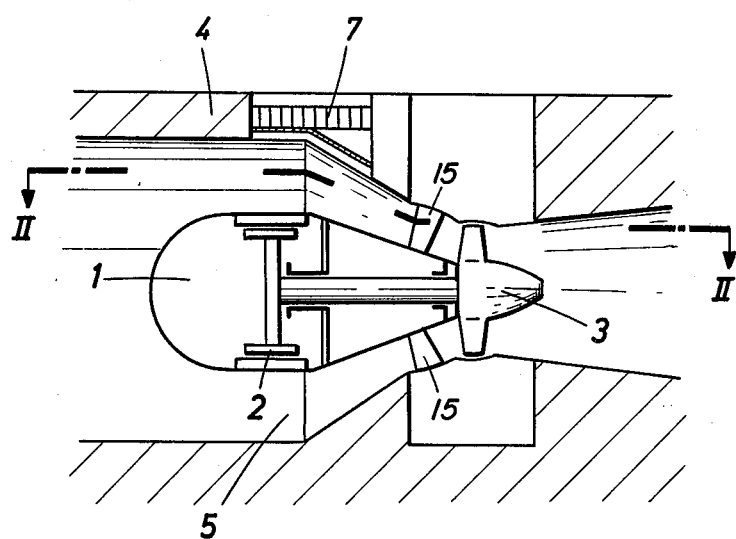

United States Patent [19]

Ziegler

[11] 3,939,357
[45] Feb. 17, 1976

[54] POWER PLANT
[75] Inventor: Gerhard Ziegler, Graz, Austria
[73] Assignee: Vereinigte Osterreichische Eisen- und Stahlwerke-Alpine Montan Aktiengesellschaft, Vienna, Austria
[22] Filed: Oct. 29, 1973
[21] Appl. No.: 410,497

[30] Foreign Application Priority Data
Nov. 3, 1972 Austria ............................ 9370/72

[52] U.S. Cl. ................................. 290/52; 415/126
[51] Int. Cl.² ......................................... H02K 7/18
[58] Field of Search ............ 240/42, 43, 52, 53, 54; 415/126

[56] References Cited
UNITED STATES PATENTS
2,214,656  9/1940  Briggs ............................ 230/123 A
2,436,683  2/1948  Wood ................................... 290/54
2,634,375  4/1953  Guinbal ............................... 290/52
3,393,324  7/1968  Hauses et al. ........................ 290/52
3,535,540  10/1970 Boulogne ............................. 290/52
3,606,568  9/1971  Braikevitch et al. ............... 290/52 X FOREIGN PATENTS OR APPLICATIONS
1,052,221  9/1953  France .............................. 415/126

Primary Examiner—James R. Scott
Assistant Examiner—John W. Redman
Attorney, Agent, or Firm—Kurt Kelman

[57] ABSTRACT

A carrying structure has a wall which defines a duct. A central structure comprising an axial-flow turbine and a generator is disposed in said duct. At least two radial arms, which are substantially horizontal, are rigidly fixed to said wall and hinged to said central structure.

6 Claims, 4 Drawing Figures

POWER PLANT

This invention relates to a duct-installed turbine-generator assembly which comprises a central structure, which is surrounded by flowing water. The assembly consists of a generator and a turbine and is supported by at least two radial arms, which are fixed to the wall of a tunnel or the like.

In the turbine of said assembly, the runner is axially flown through and the water is guided along a substantially straight path from the turbine inlet to the draft tube outlet.

A major difficulty arising in such duct-installed turbine-generator assemblies relates to the mounting of the central structure. The means by which said central structure is supported on the duct wall or generally on the carrying structure are important structural elements of any duct-installed turbine-generator assembly because these supporting means must take up all forces and moments to which the carrying structure is subjected. The water for driving the turbine should be supplied to the guide vanes of the turbine in a uniform distribution around the entire circumference thereof and with a minimum of resistance to flow. The assembly should be manufactured economically and should be shipped and installed in a simple manner.

Numerous proposals have been made for the mounting of the central structure. According to one proposal, the central structure is supported by a central rib of concrete. In that case, all parts of the central structure must meet extremely stringent requirements as regards stiffness and strength so that this mounting cannot be adopted for large machines.

Alternatively, the central structure may be supported on the duct wall at one end by two wings which extend along a major part of the length of the central structure, and at the other end by a plurality of fixed guide vanes. These supporting vanes form a part which is large in relation to the size of the entire machine, and considerable requirements are to be met by the equipment required to manufacture it, e.g., as regards the size of the annealing furnace etc. The shipment of said part is also difficult.

Duct-installed turbines are known, such as disclosed in Austrian Pat. No. 288,996, which have a central structure that is supported by two vertical arms which are interconnected within the central structure and are not pivoted to the duct wall by a number of hinged supports. These means for supporting the central structure also involve a considerable expenditure and, where they are used, the turbine housing with its two arms has dimensions which involve difficulties in manufacture and shipment. Besides, the use of the previously known supports for the central structure requires the latter to be installed in a relatively early phase of the overall construction project so that the time available for the manufacture of the turbine-generator assembly is relatively short and the central structure must be delivered and installed before the construction of the duct has been completed.

In conclusion, it may be observed that all previously known mountings for duct-installed turbine-generator assemblies involve a rigid connection between the central structure and supporting wings or arms and this results in the great disadvantage that moments are transmitted to and must be taken up by the central structure. As a result, the housing of the central structure must be relatively heavy and expensive so that the overall expenditure is uneconomically increased. In this respect the specific connections between the supporting arms or wings and the duct-confining wall or the carrying structure in general are not highly significant.

It is an object of the invention to eliminate these disadvantages and to provide a duct-installed turbine-generator assembly which is of the kind described first hereinbefore and whose central structure is supported by components which are small relative to the size of the machine and which do not heavily load the central structure, whereas they render the installation of the machine less dependent on the progress of the carrying structure and facilitate said installation, meet all requirements as regards strength and flow conditions and for this reason may be used in large duct-installed turbine-generator assemblies.

This object is accomplished according to the invention with a central structure hinged to the substantially horizontal arms. The hinges which connect the arms to the central structure can transmit forces to the central structure but cannot transmit moments thereto. For this reason, the central structure may be simple in design and relatively light in weight. Besides, such hinges can be made without difficulty. Above all, the central structure and the hinges may be manufactured and shipped separately from each other and the arms alone can be installed in the carrying structure or duct as it its construction progresses whereas the central structure or parts thereof are introduced into the duct through suitable installation openings and connected to the arms by hinges when the carrying structure has been completed. To permit of this subsequent installation of the central structure, the arms must extend substantially horizontally because the central structure must be inserted into the duct from above by means of a crane or the like. Because the arms are manufactured as components which are independent of the central structure, the dimensions of the components relative to the overall size of the machine are reduced so that this arrangement may be used for machines having any desired dimensions. It will be understood that the horizontally extending arms may have an aerodynamically desirable shape or be provided with an aerodynamically desirable fairing so that the arms which are disposed in a plane do not obstruct the flow and the desired uniform distribution of the flow is obtained before the guide vanes of the turbine. Where a plurality of machines are arranged one beside the other, the fixation of the arms in the concrete wall which confines the duct may be assisted in that the arms of two adjacent machines are interconnected in the wall which separates these two machines or the ducts in which they are installed.

Particularly desirable hinges according to the invention between the central structure and the arms will be obtained if the central structure is provided adjacent to the arms with bearing members which are parallel to the longitudinal axis of the machine and have a cylindrical surface which is embraced by bearing shells provided on the arms. Such hinges permit of a rotation but prevent a vertical or lateral yield of the central structure. In this way the central structure is mounted in the desired manner so that it is rotatable to some extent but cannot assume an oblique orientation. The parts of these hinges are not complicated and can be made at low cost.

In another embodiment of the invention, the hinges between the central structure and the arms comprise resilient connecting members, each of which consists preferably of a diaphragm which extends transversely to the longitudinal axis of the respective arm and is rigidly connected at its rim to the arm and at its center to a bracket carried by the central structure and which bears on the arm adjacent to the brackets by means of a crowned pad. The diaphragm extends transversely to the horizontal direction and takes up vertical forces. The pad which bears on the arm prevents a lateral movement of the central structure and takes up the loads which act in this direction. On the other hand, the central structure can rotate to some extent relative to the arms because the diaphragm is resilient and the pad is rounded so that the desired hinge is provided in this case too.

It will be particularly desirable to provide pairs of arms which are disposed one behind the other in the direction of flow. In such arrangement, all forces and moments acting on the central structure can be taken up and transmitted well without risk of an oblique orientation of the machine axis. The arms themselves may be relatively narrow in that case and the hinges need not be excessively large.

According to the invention, the arms are formed by the duct-confining wall in that the arms consist of ribs or noselike projections or the like provided on the duct-confining wall. Such an arrangement has the advantage that the arms can be made at lower cost because they may be made directly with the duct-confining wall from reinforced concrete just as said wall.

Figure 2:
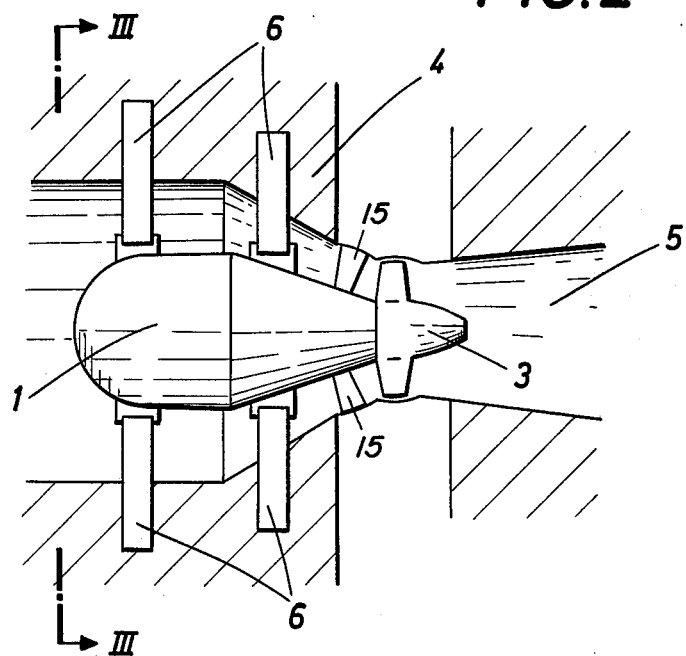
Figure 3:
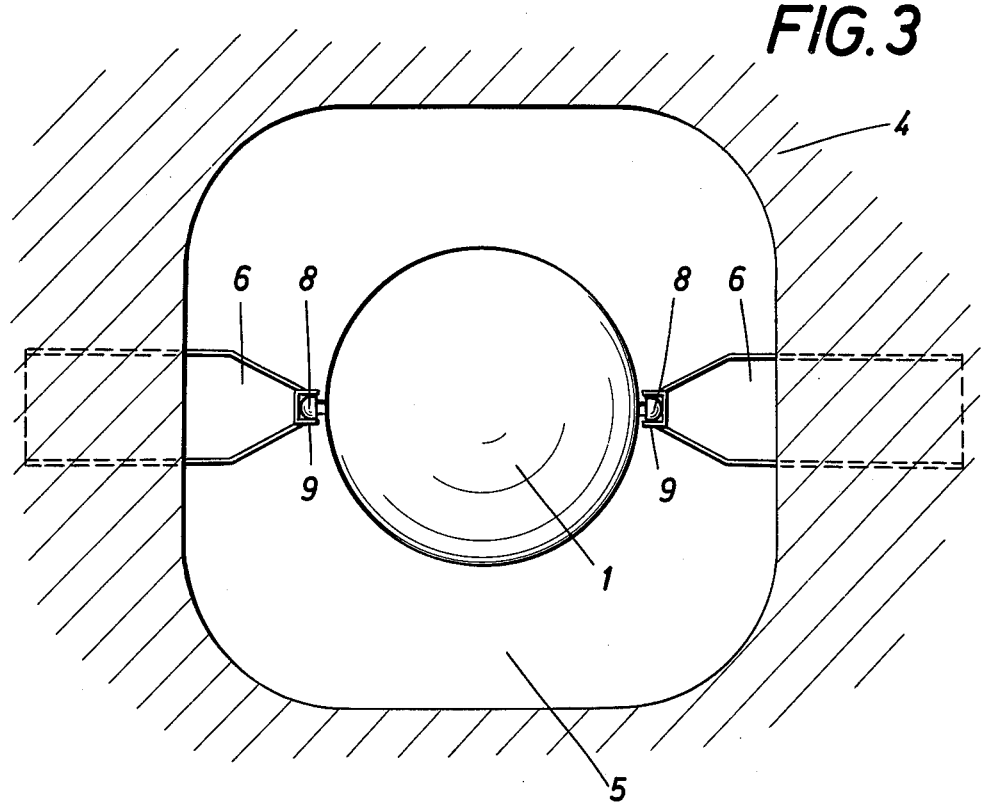
Figure 4:
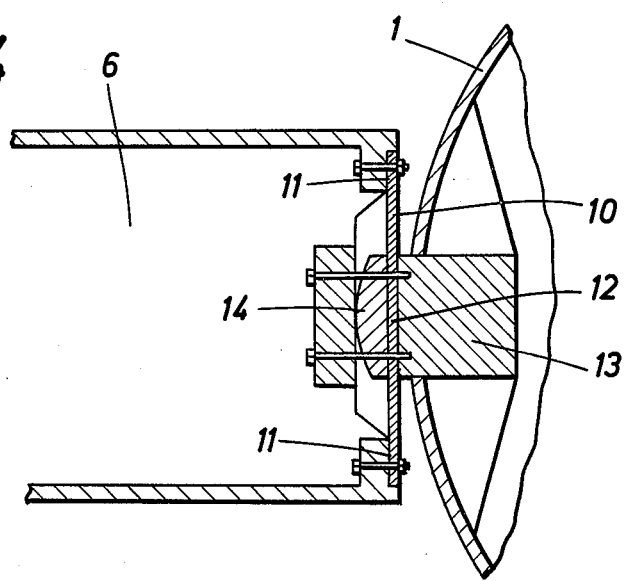

The invention is strictly diagrammatically illustrated on the accompanying drawings, in which FIG. 1 is a vertical axial sectional view showing a duct-installed turbine-generator assembly according to the invention, FIG. 2 is a sectional view taken on line II—II in FIG. 1, FIG. 3 is an enlarged sectional view taken on line III—III in FIG. 2, and FIG. 4 is a transverse sectional view showing on a larger scale an articulated joint which is provided between the central structure and an arm and consists of a resilient connecting member.

The duct-installed turbine-generator assembly according to the invention comprises a central structure 1, which consists essentially of a generator 2 and an axial-flow turbine 3. This turbine 3 is of a type in which the runner is axially flown through and the water is guided along a substantially straight path from the turbine inlet to the draft tube outlet. Optionally, as disclosed in prior art Austrian Pat. No. 288,996, guide vanes 15 may be included for water flow improvement. The central structure 1 is disposed in a duct 5, which is confined by a wall of a carrying structure 4 and is supported on the wall by four horizontal arms 6, which are rigidly anchored in the duct-confining wall of the carrying structure 4 and are hinged to the central structure. The hinges between the central structure 1 and the arms 6 ensure that the central structure remains substantially free of moments because the hinges cannot transmit moments to the central structure from the outside. For this reason, the housing of the central structure may be relatively simple and does not require special carrying elements. Because hinges are provided between the arms 6 and the central structure 1, these parts may be made separately from each other so that the size of the components remains within tolerable limits and the arms and central structure may be separately installed. As a result, the turbine-generator assembly need not be inserted during the progress of the construction of the duct 5 but may be inserted when the entire carrying structure has been completed. Only the arms 6 must be embedded in the concrete of the carrying structure 4 during the construction of the duct. The central structure 1 or its parts are then subsequently introduced into the duct through an installation opening 7 by means of a crane or the like and in the duct are assembled and connected to the arms.

As is apparent from FIGS. 3 and 4, various forms of hinges may be provided between the arms 6 and the central structure 1. FIG. 3 shows a true articulated joint because the central structure is provided adjacent to the arms 6 with bearing members 8 which extend parallel to the longitudinal axis of the machine and have cylindrical surfaces, and the arms are provided with bearing shells 9 which embrace the cylindrical surfaces of the bearing members 9. These articulated joints permit of a rotational movement of the central structure relative to the arms but do not permit of vertical and horizontal movements.

FIG. 4 shows that the hinges between the arms 6 and the central structure 1 may consist of resilient connecting members. Each resilient connecting member consists of a diaphragm 10 which extends transversely to the longitudinal axis of the respective arm and which is rigidly connected at its rim 11 to the respective arm 6 and at its central portion 12 to a bracket 13 of the central structure 1. Adjacent to the bracket 13 the diaphragm 10 is provided with a crowned pad 14, which bears on the arm 6 so that the loads acting in the longitudinal direction of the arm can be taken up without stressing the diaphragm. The diaphragm 10 is sufficiently resilient only transversely to its surface so that it can readily take up forces acting in the plane of the diaphragm and lateral, vertical and horizontal movements of the central structure are prevented whereas a strictly rotational movement is permitted and is facilitated by the crowned pad.

It is apparent that the hinges between the central structure 1 and the arms 6 may consist of true articulated joints or of resilient connecting members because hinges of both kinds permit of a certain rotational movement of the central structure relative to the arms but do not permit of any relative movement in the direction of flow or transversely to the direction of flow so that an undesired oblique orientation of the machine axis is reliably avoided and the central structure is hinged to the arms as desired.

What is claimed is:
1. In a power plant which comprises
 (1) a carrying structure having a wall defining a duct having an axis,
 (2) a central structure comprising an axial-flow turbine and a generator,
   (a) the central structure being disposed substantially coaxially in the duct, and
 (3) a pair of radial arms rigidly fixed to the wall and extending diametrically and substantially perpendicularly to the axis, on a horizontal plane, the improvement of
 (4) hinge means connecting each of the arms to the central structure for pivoting the central structure about an axis substantially parallel to the axis of the duct.

2. In the power plant defined in claim 1, the hinge means comprising a bearing member affixed to the central structure and having a cylindrical surface, and a bearing shell affixed to the arm and embracing the cylindrical surface of the bearing member.

3. In the power plant defined in claim 1, two of said pairs of radial arms, the pairs of arms being spaced along the axis of the duct.

4. In the power plant defined in claim 1, the arms being integral with the wall.

5. In a power plant which comprises
(1) a carrying structure having a wall defining a duct having an axis,
(2) a central structure comprising an axial-flow turbine and a generator,
   (a) the central structure being disposed substantially coaxially in the duct, and
(3) a pair of radial arms rigidly fixed to the wall and extending diametrically and substantially perpendicularly to the axis, on a horizontal plane, the improvement of
(4) hinge means comprising a resilient connecting member connecting each of the arms to the central structure for pivoting the central structure about an axis substantially parallel to the axis of the duct.

6. In the power plant defined in claim 5, the resilient connecting member being a diaphragm having a rim and a central portion, the diaphragm extending substantially parallel to the axis of the duct and the rim being ridigly connected to the arm, the central structure carrying a radial bracket substantially coaxial with the arm and rigidly connected to the central portion of the diaphragm, and the central portion carrying a crowned pad substantially coaxial with the arm and the bracket, the crowned pad bearing on the arm.

* * * * *